(12) United States Patent
Earl et al.

(10) Patent No.: US 8,651,528 B2
(45) Date of Patent: Feb. 18, 2014

(54) VEHICLE SPLASH GUARD

(75) Inventors: Ashley Earl, Commerce Township, MI (US); Barugur S Balasundaramohan, Troy, MI (US)

(73) Assignee: Nissan North America, Inc., Franklin, TN (US)

( * ) Notice: Subject to any disclaimer, the term of this patent is extended or adjusted under 35 U.S.C. 154(b) by 342 days.

(21) Appl. No.: 13/163,364

(22) Filed: Jun. 17, 2011

(65) Prior Publication Data

US 2012/0319392 A1  Dec. 20, 2012

(51) Int. Cl.
*B62D 25/18* (2006.01)

(52) U.S. Cl.
USPC .............................. 280/851; 280/847; 280/848

(58) Field of Classification Search
USPC ............... 280/851, 847, 152.2, 848, 154, 849
See application file for complete search history.

(56) References Cited

U.S. PATENT DOCUMENTS

| | | | |
|---|---|---|---|
| 4,293,140 A | | 10/1981 | Bell et al. |
| 4,315,634 A | * | 2/1982 | Arenhold ....................... 280/851 |
| 4,629,204 A | * | 12/1986 | Arenhold ....................... 280/851 |
| 4,709,938 A | | 12/1987 | Ward et al. |
| 4,712,805 A | * | 12/1987 | McMillen ...................... 280/851 |
| 4,877,268 A | | 10/1989 | Price |
| 4,927,177 A | | 5/1990 | Price |
| 5,048,868 A | * | 9/1991 | Arenhold ....................... 280/848 |
| 5,120,082 A | | 6/1992 | Ito |
| 5,407,229 A | * | 4/1995 | Garrett ........................... 280/851 |
| 5,489,108 A | * | 2/1996 | Slade .......................... 280/152.3 |
| 5,722,690 A | | 3/1998 | Ward et al. |
| 5,899,500 A | | 5/1999 | Benvenuto |
| 6,029,999 A | * | 2/2000 | O'Day ........................... 280/851 |
| 6,193,278 B1 | | 2/2001 | Ward et al. |
| 7,114,749 B2 | * | 10/2006 | Ward .............................. 280/848 |
| 7,258,366 B2 | * | 8/2007 | Yingling et al. ............... 280/851 |
| 7,578,526 B2 | * | 8/2009 | Jaeger ............................ 280/848 |
| 7,914,046 B2 | * | 3/2011 | Iverson ......................... 280/848 |
| 8,118,329 B2 | * | 2/2012 | Braga ........................... 280/848 |

FOREIGN PATENT DOCUMENTS

| | | |
|---|---|---|
| JP | 4-254267 A | 9/1992 |
| JP | 5-319311 A | 12/1993 |
| JP | 7-315251 A | 12/1995 |
| JP | 8-119148 A | 5/1996 |
| JP | 9-104366 A | 4/1997 |

\* cited by examiner

*Primary Examiner* — J. Allen Shriver, II
*Assistant Examiner* — James M Dolak
(74) *Attorney, Agent, or Firm* — Global IP Counselors

(57) ABSTRACT

A vehicle splash guard comprises a base portion, a guard portion, a mounting portion, a mating portion and a flexible portion. The guard portion extends from the base portion. The mounting portion extends from the base portion and is configured to mount to a vehicle body structure. The mounting portion includes a mounting portion free edge. The mating portion is configured to abut the vehicle body structure. The mating portion includes a first mating portion free edge and a second mating portion free edge. The first mating portion free edge extends from the base portion to the mounting portion. The flexible portion is defined by the mounting portion free edge and the second mating portion free edge, such that the guard portion is configured to move about the flexible portion between a normal position in which the second mating portion free edge is positioned at a first position proximate to the mounting portion free edge and a flexed position in which the second mating portion free edge is spaced at a second position further apart from the mounting portion free edge than the first position.

29 Claims, 9 Drawing Sheets

VEHICLE SPLASH GUARD

BACKGROUND

1. Field of the Invention

The present invention generally relates to a vehicle splash guard. More specifically, the present invention relates to a vehicle splash guard that is configured to flex without cracking or with only minimal cracking.

2. Background Information

Splash guards are often included in wheel wells of taller vehicles to prevent water, mud and other objects from being projected from the tires. A splash guard typically has a mounting portion that attaches directly to the vehicle body and the rear bumper fascia. The splash guard also generally includes a fascia mating portion which abuts and mates with the bumper fascia for aesthetic purposes, and a guard portion that extends downward from the mounting portion and the fascia mating portion. When the guard portion makes contact with substantial objects, such as a curb or large rocks, the guard portion will tend to rotate relative to the mounting portion. This movement can cause breakage of the guard portion from the mounting portion, the fascia mating portion, or both.

SUMMARY

In a vehicle splash guard, a pocket can be formed between the mounting portion, the mating portion, and a base portion that is above the guard portion. The base portion can be integral with the mounting portion for an entire distance to where the mounting portion meets the lateral wall of the mating portion. When the guard portion needs to flex longitudinally with respect to the vehicle, the guard portion tends to rotate about the point where the corner of the base surface and mounting portion meets the lateral wall of the fascia mating portion, with the stress concentrated at that point. This causes the guard portion and the mating portion to crack and separate from the mounting portion.

Accordingly, in view of the state of the known technology, one aspect of the present invention is to provide a vehicle splash guard comprising a base portion, a guard portion, a mounting portion, a mating portion and a flexible portion. The guard portion extends from the base portion. The mounting portion extends from the base portion and is configured to mount to a vehicle body structure. The mounting portion includes a mounting portion free edge. The mating portion is configured to abut the vehicle body structure. The mating portion includes a first mating portion free edge and a second mating portion free edge. The first mating portion free edge extends from the base portion to the mounting portion. The flexible portion is defined by the mounting portion free edge and the second mating portion free edge, such that the guard portion is configured to move about the flexible portion between a normal position in which the second mating portion free edge is positioned at a first position proximate to the mounting portion free edge and a flexed position in which the second mating portion free edge is spaced at a second position further apart from the mounting portion free edge than the first position.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
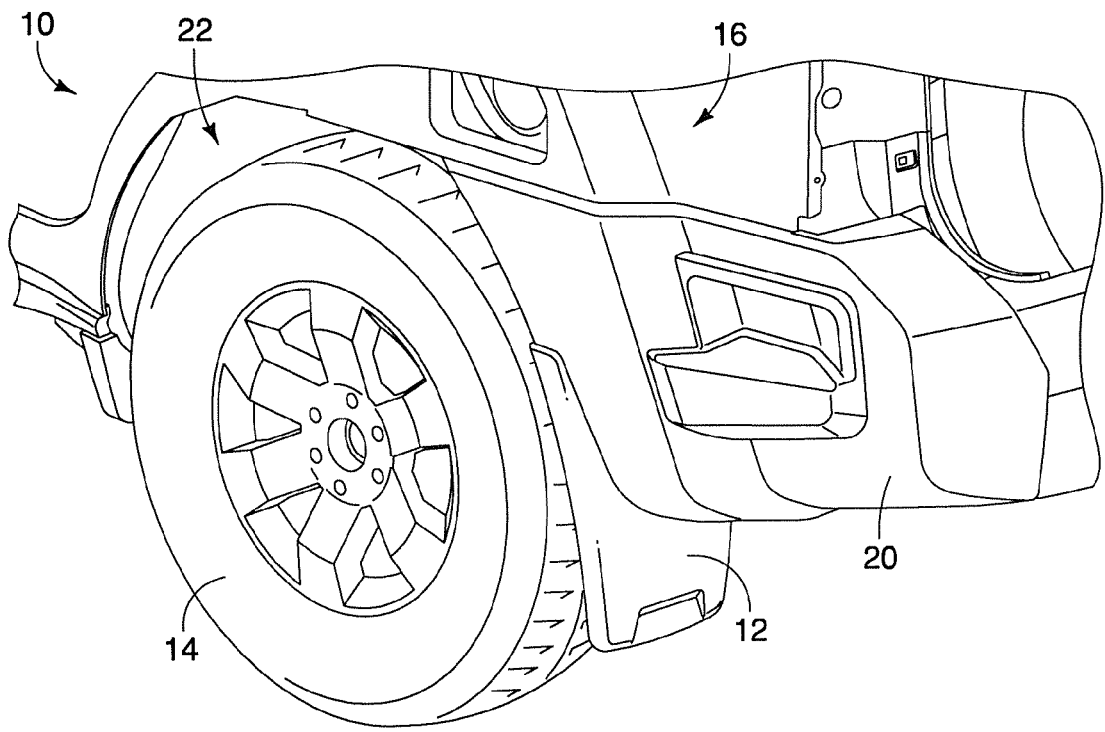
FIG. 1 is an elevated rear perspective view of a vehicle body and a vehicle splash guard according to a disclosed embodiment installed on the vehicle body proximate to a rear wheel of the vehicle, with the vehicle splash guard shown in a normal position.
Figure 2:
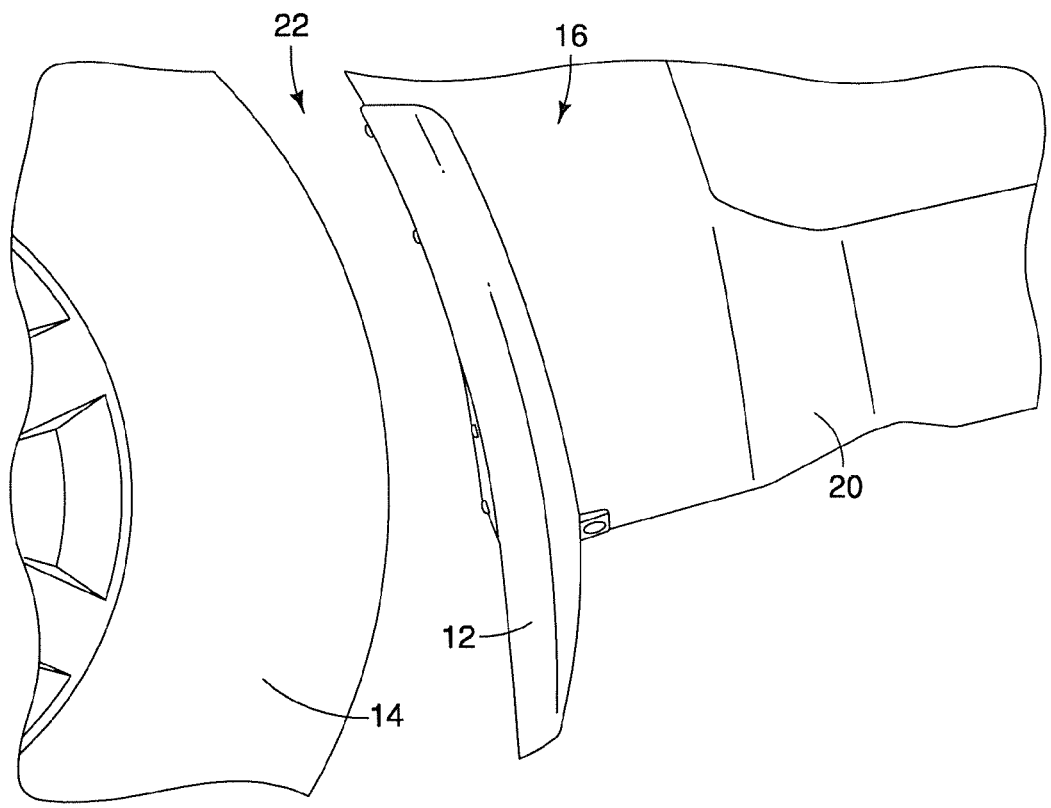
FIG. 2 is a side perspective view of the vehicle body with the vehicle splash guard installed as shown in FIG. 1.

Referring initially to FIGS. 1 and 2, a vehicle 10 can include a vehicle splash guard 12 mounted proximate to each wheel 14 of the vehicle 10. Typically, the vehicle 10 can be a taller vehicle such as a large truck. However, the vehicle 10 can be an automobile, a truck, a van, an SUV or any other suitable type of vehicle. Typically, a respective vehicle splash guard 12 is mounted behind each respective wheel 14 of the vehicle 10. However, the vehicle splash guard 12 may be mounted behind certain wheels 14, such as the rear wheels of the vehicle 10 as shown.

The vehicle splash guard 12 is preferably constructed as a one-piece, unitary member that is formed of a suitable material such as a flexible plastic as understood in the art. The vehicle splash guard 12 is a generally rigid member with a self-supporting shape. However, the vehicle splash guard 12 is also resilient in that the vehicle splash guard 12 can flex to a flexed position in the event of hitting an obstruction O, such as a rock, and then return to its original shape in its normal position as shown, for example, in FIGS. 3 and 4.

As further shown in FIGS. 1 to 6, the vehicle 10 can includes a vehicle body structure 16 that can be made of metal or any other suitable material. The vehicle body structure 16 typically includes a body panel 18, such as a fender, and a bumper fascia 20 that at least partially define the wheel well 22. The body panel 18 and the bumper fascia 20 can be made of any suitable material as understood in the art.

As shown in more detail in FIGS. 7 through 14, the vehicle splash guard 12 includes a base portion 24, a guard portion 26, a mounting portion 28, a mating portion 30 and a flexible portion 32. As illustrated, the guard portion 26 extends from the base portion 24. The mounting portion 28 also extends from the base portion 24. In this example, the base portion 24, the guard portion 26, the mounting portion 28, the mating portion 30 and the flexible portion 32 are integral with each other. However, any or all of the base portion 24, the guard portion 26, the mounting portion 28, the mating portion 30 and the flexible portion 32 can instead be separate pieces that are assembled and secured together by any suitable type of fastening members such as screws, rivets, adhesive, heat bonding and so on. Thus, the mounting portion 28, the mating portion 30, and the base portion 24 define a pocket or recess 34 with the flexible portion 32 being located adjacent to the recess 34.

Furthermore, the mounting portion 28 is configured to mount to the vehicle body structure 16. For example, the mounting portion 28 can mount to the bumper fascia 20 or to any other suitable component of the vehicle 10. That is, the mounting portion 28 can include a fascia mounting portion 36 and a body mounting portion 38. The fascia mounting portion 36 can include fascia mounting apertures 40 that can receive fasteners such as screws, rivets or any other suitable type of fasteners for securing the fascia mounting portion 36 to the bumper fascia 20 as understood in the art. Also, the body mounting portion 38 can include body mounting apertures 42 that can receive fasteners such as screws, rivets or any other suitable type of fasteners for securing the body mounting portion 38 to the vehicle body structure 16 as understood in the art. In addition, the mounting portion 28 includes a mounting portion free edge 44 that is discussed in more detail below.

As further shown, the mating portion 30 is configured to abut the vehicle body structure 16. The mating portion 30 includes a first mating portion free edge 46 and a second mating portion free edge 48. Naturally, the edge designated as the first mating portion free edge 46 can be referred to as a second mating portion free edge and vice-versa. The first mating portion free edge 46 extends from the base portion 24 to the mounting portion 28. In this example, the first mating portion free edge 46 is configured as the top edge of the mating portion 30. The flexible portion 32 is defined, at least in part, by the mounting portion free edge 44 and the second mating portion free edge 48 as shown, in particular, in FIGS. 8 and 11 through 13.

Figure 3:
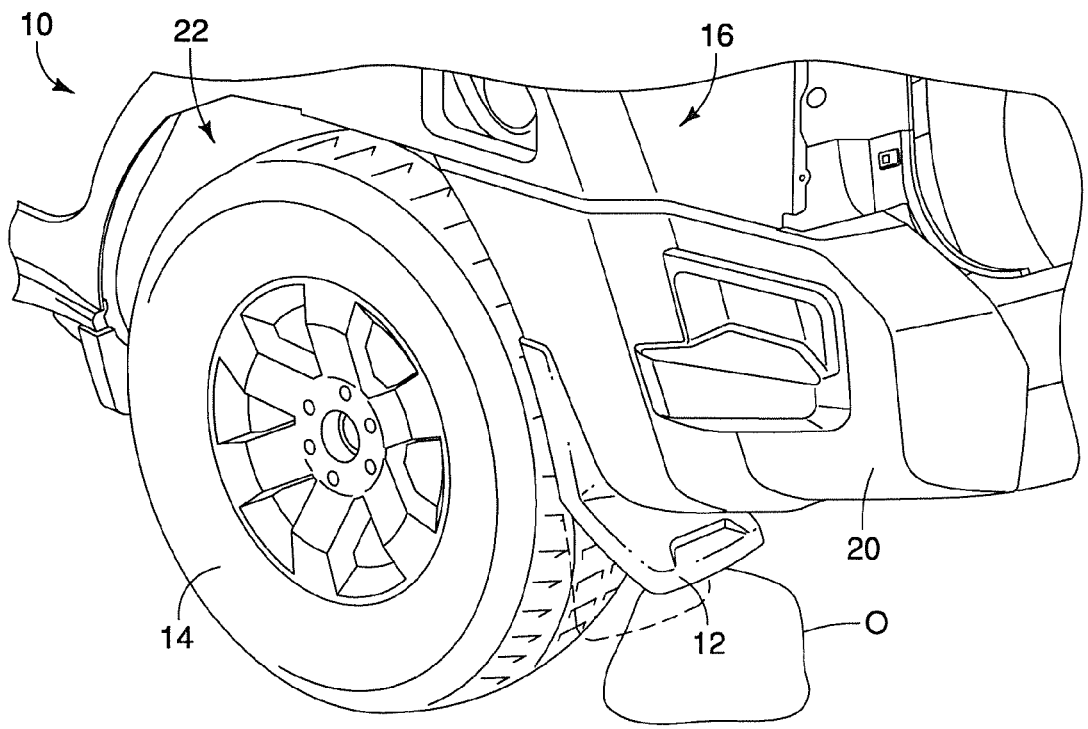
FIG. 3 is an elevated rear perspective view of the vehicle body and the vehicle splash guard with the vehicle splash guard shown in the normal position in phantom lines and in a flexed position in solid lines.
Figure 4:
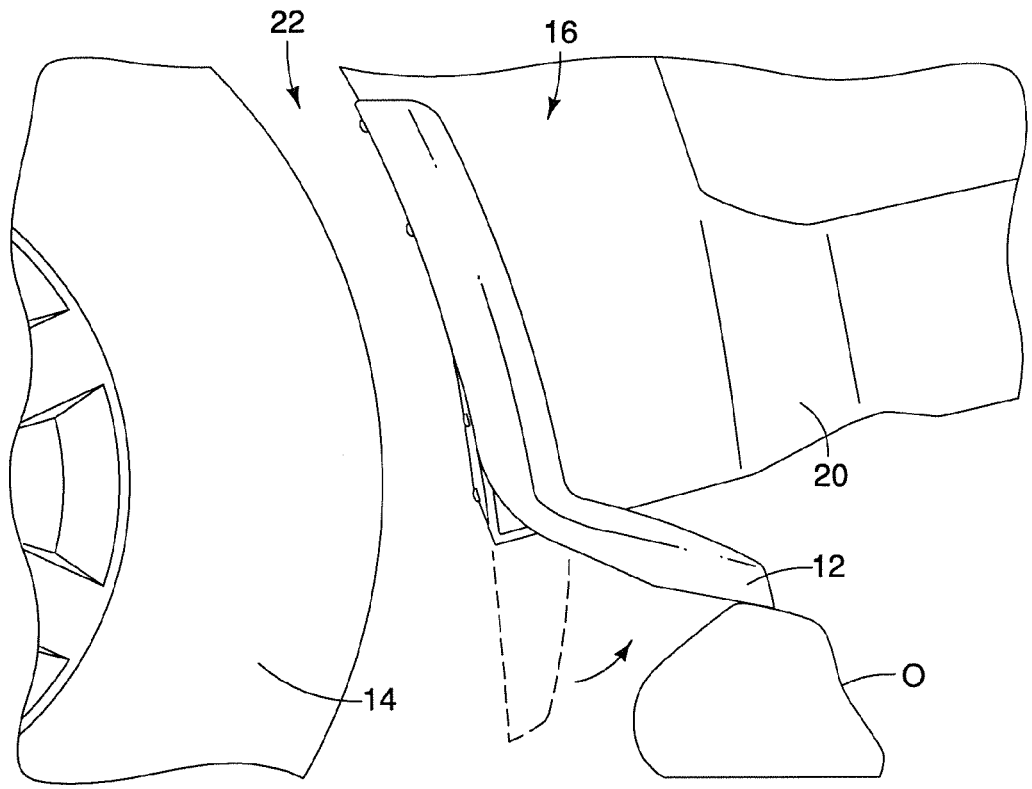
FIG. 4 is a side perspective view of the vehicle body and the vehicle splash guard with the vehicle splash guard shown in the normal position in phantom lines and in a flexed position in solid lines.
Figure 5:
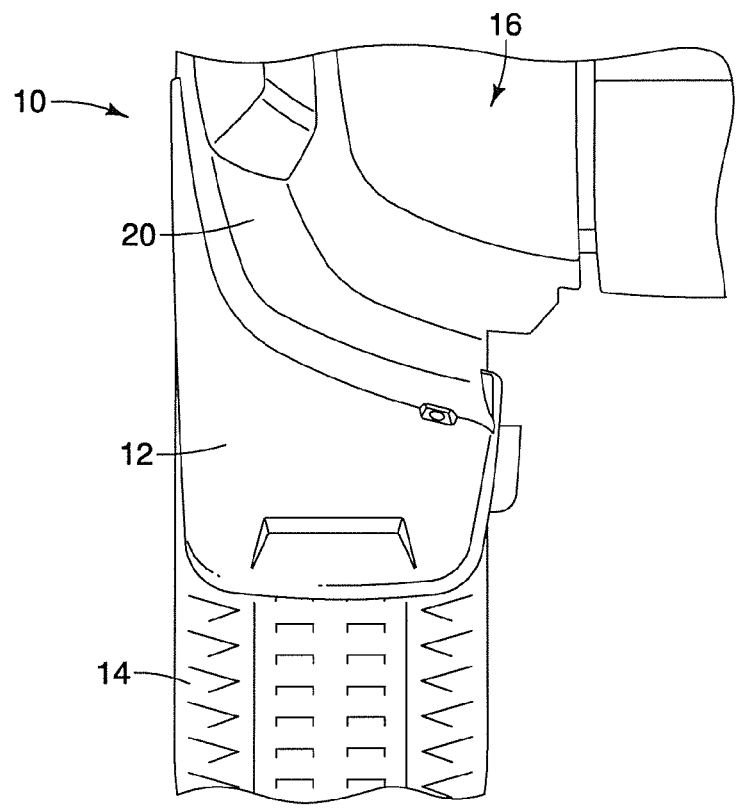
FIG. 5 is a rear perspective view of the vehicle body with the vehicle splash guard in the normal position.
Figure 6:
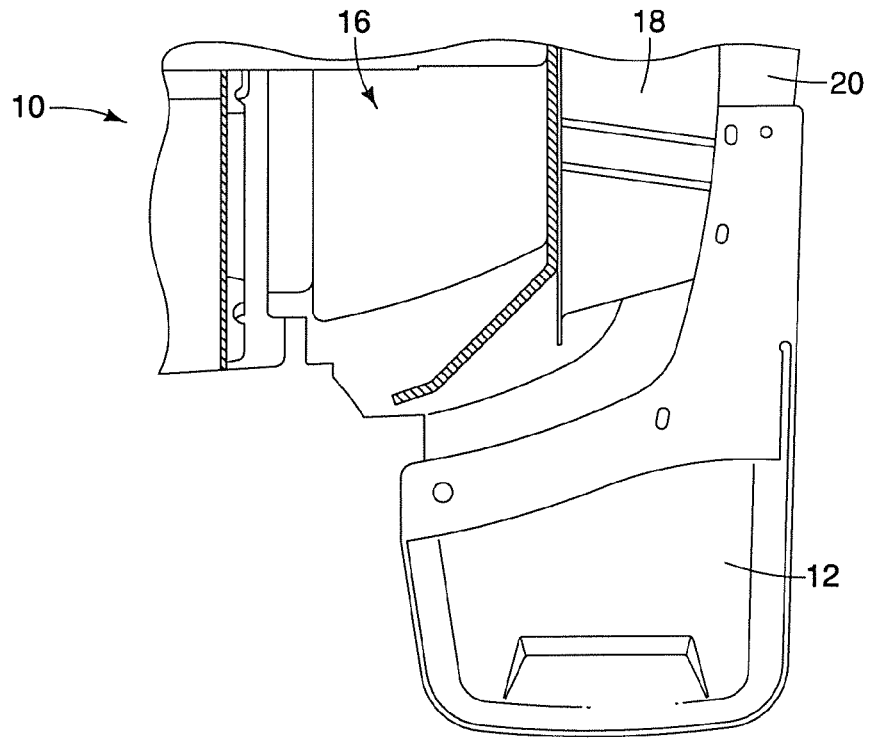
FIG. 6 is a front perspective view of the vehicle body with the vehicle splash guard installed and the wheel removed for illustrative purposes.
Figure 7:
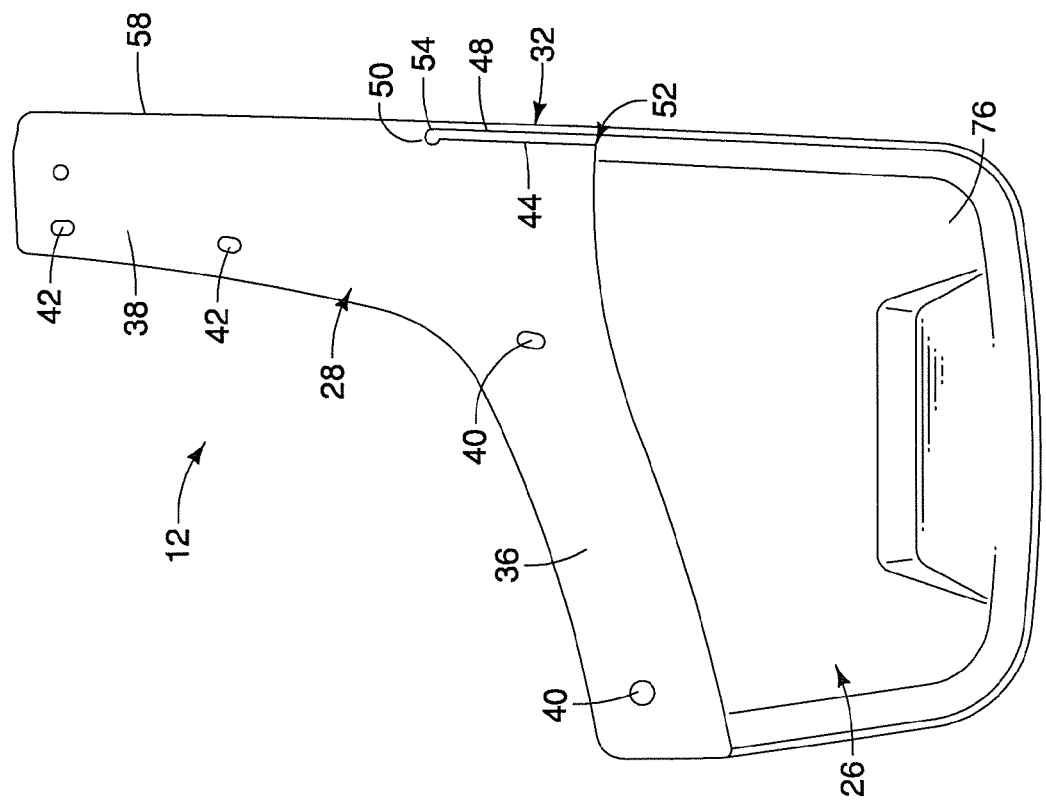
FIG. 7 is a rear perspective view of the vehicle splash guard in the normal position.

When the vehicle 10 is moving and the vehicle splash guard 12 contacts an obstruction P, such as a rock, as shown in FIGS. 3 and 4, the obstruction O may temporarily inhibit the vehicle splash guard 12 from moving with the vehicle 10. In this event, the guard portion 26 may begin to flex from the normal position to the flexed position as shown in FIGS. 3 and 4. Accordingly, the guard portion 26 is configured to move about the flexible portion 32 between a normal position (FIGS. 1 and 2) in which the second mating portion free edge 48 is positioned at a first position proximate to the mounting portion free edge 44 (FIGS. 8 and 11 through 13) and a flexed position (FIGS. 3 and 4) in which the second mating portion free edge 48 is spaced at a second position further apart from the mounting portion free edge 44 than the first position (FIGS. 15 through 18). Thus, as understood in the art, this movement of the mounting portion free edge 44 and second mating portion free edge 48 away from each other when the guard portion 26 moves to the flexed position can relieve stress in the flexible portion 32 and thus prevent the flexible portion 32 from cracking or at least reduce the severity of any cracking that may occur.

Figure 8:
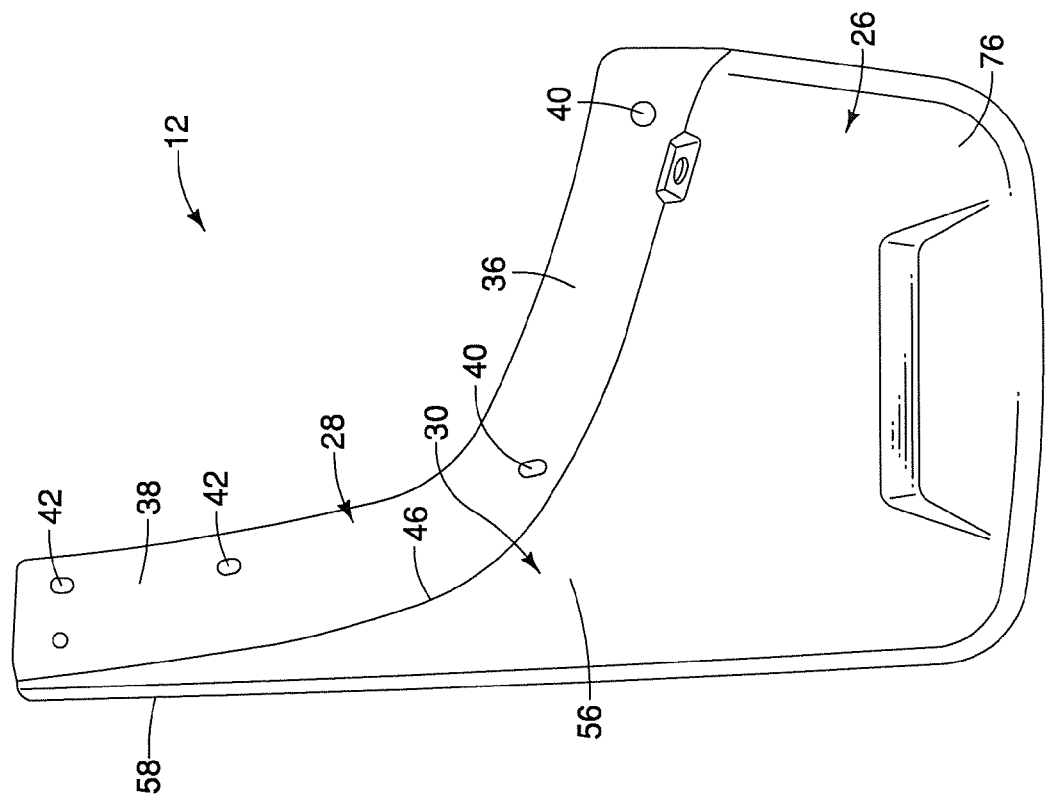
FIG. 8 is a front perspective view of the vehicle splash guard in the normal position.
Figure 11:
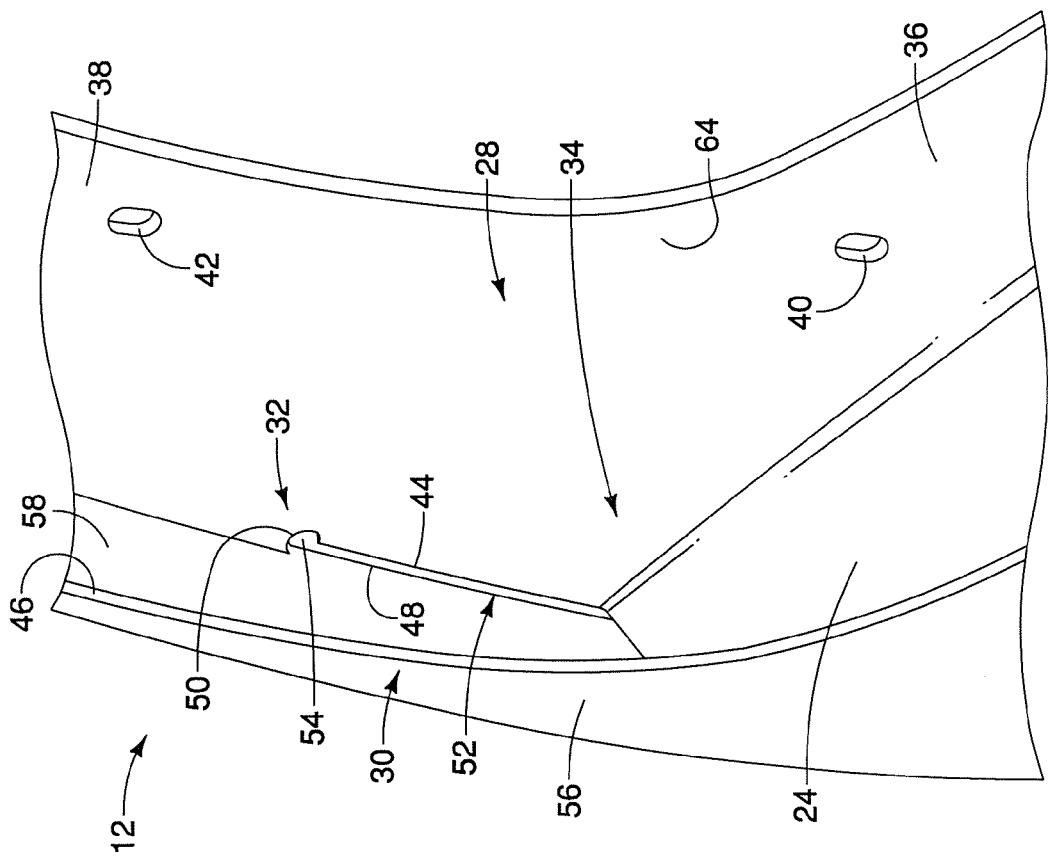
FIG. 11 is a detailed perspective view of the vehicle splash guard showing the pocket and a gap when the vehicle splash guard is in the normal position.
Figure 13:
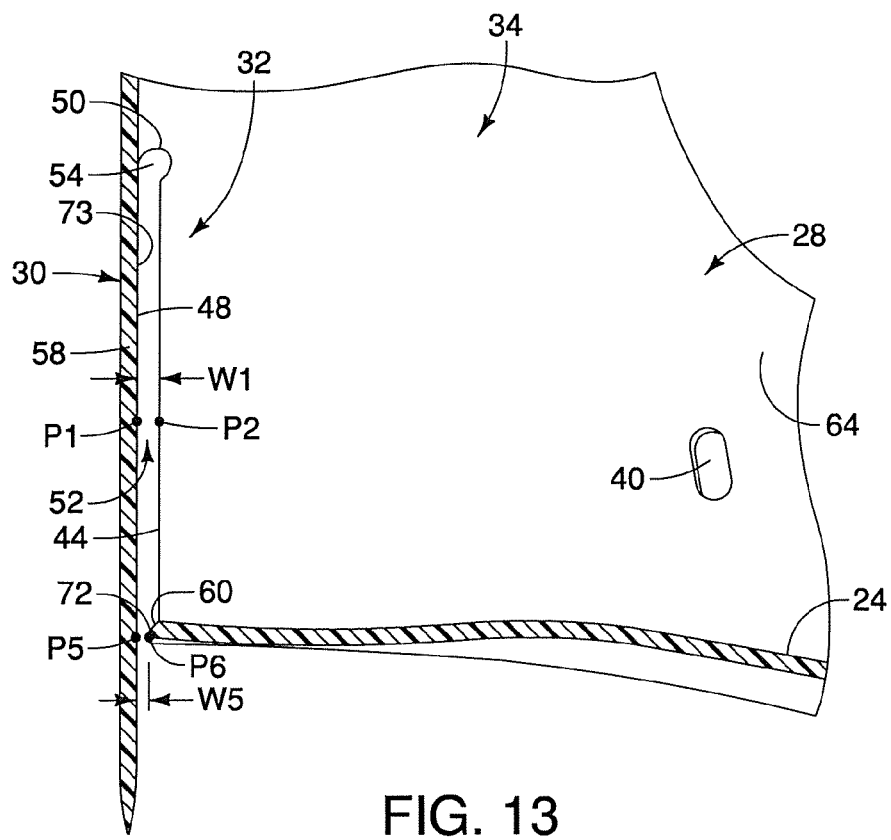
FIG. 13 is a cross-section view of the vehicle splash guard taken along the lines 13-13 in FIG. 9 showing a separation between the mounting portion and the base portion from a lateral wall of the mating portion when the vehicle splash guard is in the normal position.

As further illustrated, the flexible portion 32 defines a first apex 50 at which the second mating portion free edge 48 joins the mounting portion free edge 44. Also, the mounting portion free edge 44 extends from the base portion 24 to the first apex 50. In this example, the flexible portion 32 defines a first gap 52 between the second mating portion free edge 48 and the mounting portion free edge 44. The first gap 52 can also include an enlarged portion 54 near the first apex 50. The first gap 52 has a first width W1 defined between point P1 along the second mating portion free edge 48 and point P2 along the mounting portion free edge 44 as shown in FIGS. 8 and 11 though 13 when the guard portion 26 is in the normal position. Thus, when the guard portion 26 is in the normal position, the points P1 and P2 are directly adjacent. The first gap 52 has a second width W2 as shown in FIGS. 15 through 18 when the guard portion 26 is in the flexed configuration. That is, as is apparent from the Figures, the points P1 and P2 are spaced apart when the guard portion 26 is in the flexed position. Thus, the second width W2 is larger than the first width W1.

It should also be understood that the mounting portion free edge 44 and second mating portion free edge 48 can contact each other, or at least partially contact each other, when the guard portion 26 is in the normal position (e.g., first width W1 is zero or substantially zero). In this event, the mounting portion free edge 44 and the second mating portion free edge 48 can still define the first gap 52 having the second width W2 when the guard portion 26 is in the flexed position. In other words, the guard portion 26 moves about the flexible portion 32 between a normal position and a flexed position in which the mating portion 30 and the mounting portion 28 define a gap (e.g., enlarged first gap 52) between the mounting portion 28 and the mating portion 30.

In addition, the mating portion 30 includes a rearward wall 56 and a lateral wall 58 that extends transversely from the rearward wall 56. Accordingly, in this example, the first mating portion free edge 46 extends along the top of the rearward wall 56 and the lateral wall 58, and the second mating portion free edge 48 extends along at least a portion of the lateral wall 58. Also, the lateral wall 58 is integral with the guard portion 26 and separate from the base portion 24. Furthermore, the lateral wall 58 is joined or integral with the mounting portion 28 from the first apex 50 to the first mating portion free edge 46.

As further shown, the base portion 24 includes a base portion free edge 60. The base portion free edge 60 thus further defines the flexible portion 32. In this example, the base portion free edge 60 is positioned adjacent to the mating portion 30 as shown, for example, in FIGS. 13 and 14. Specifically, the base portion free edge 60 is positioned adjacent to a forward facing surface 62 of the rearward wall 56 of the mating portion 30. Also, as can further be appreciated from FIG. 14 in particular, the mounting portion 28 includes a rearward facing surface 64. The base portion 24 is formed integrally with and extends transversely to the rearward facing surface 64. Also, the base portion 24 extends transversely from the lateral wall 58 and the rearward wall 56.

Figure 10:
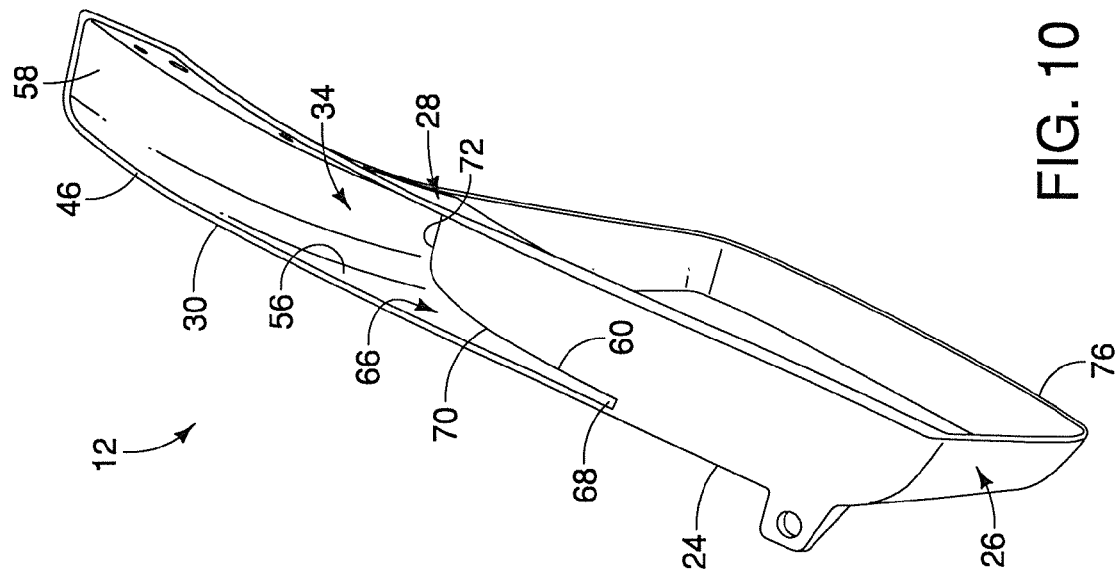
FIG. 10 is an elevated top perspective view of the vehicle splash guard showing the pocket in more detail when the vehicle splash guard is in the normal position.
Figure 9:
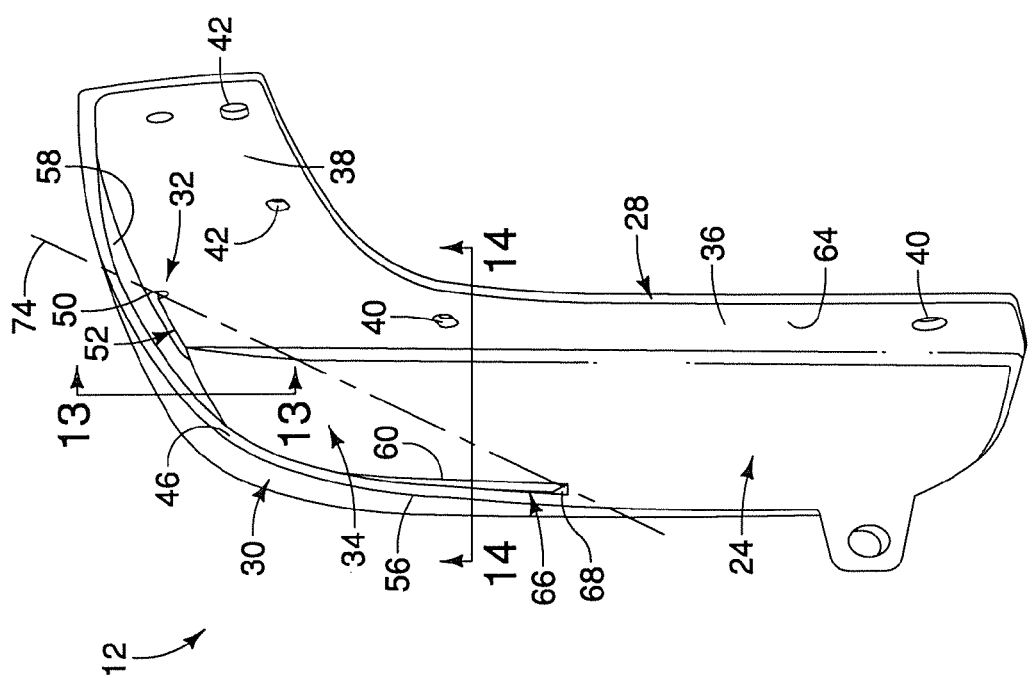
FIG. 9 is an elevated top perspective view of the vehicle splash guard showing an example of the pocket and the gaps in the vehicle splash guard when the vehicle splash guard is in the normal position.
Figure 12:
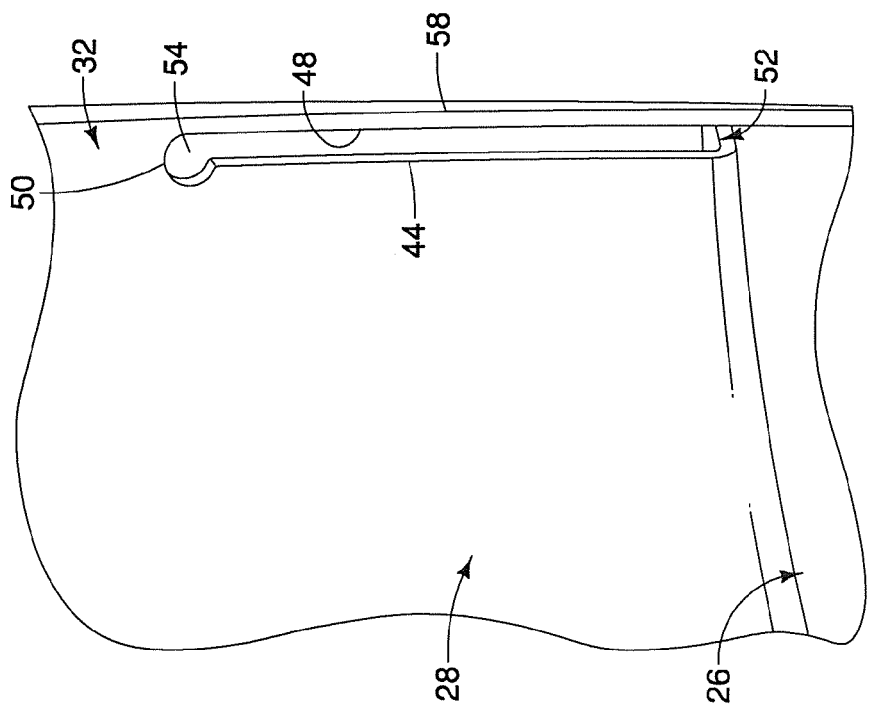
FIG. 12 is a detailed front view of the vehicle splash guard further illustrating the gap shown in FIG. 11.
Figure 14:
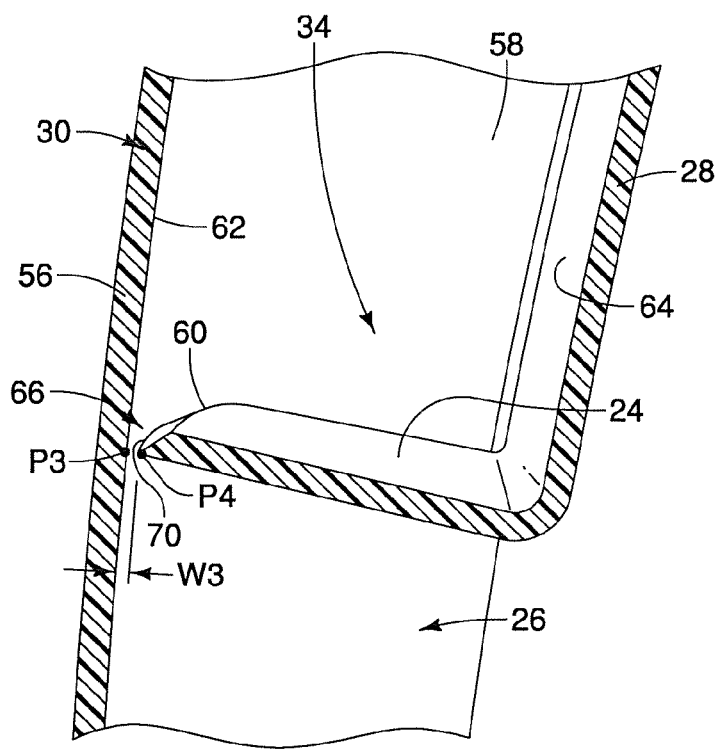
FIG. 14 is a cross-section view of the vehicle splash guard taken along the lines 14-14 in FIG. 7 showing a separation between the base portion and the mating portion when the vehicle splash guard is in the normal position.
Figure 16:
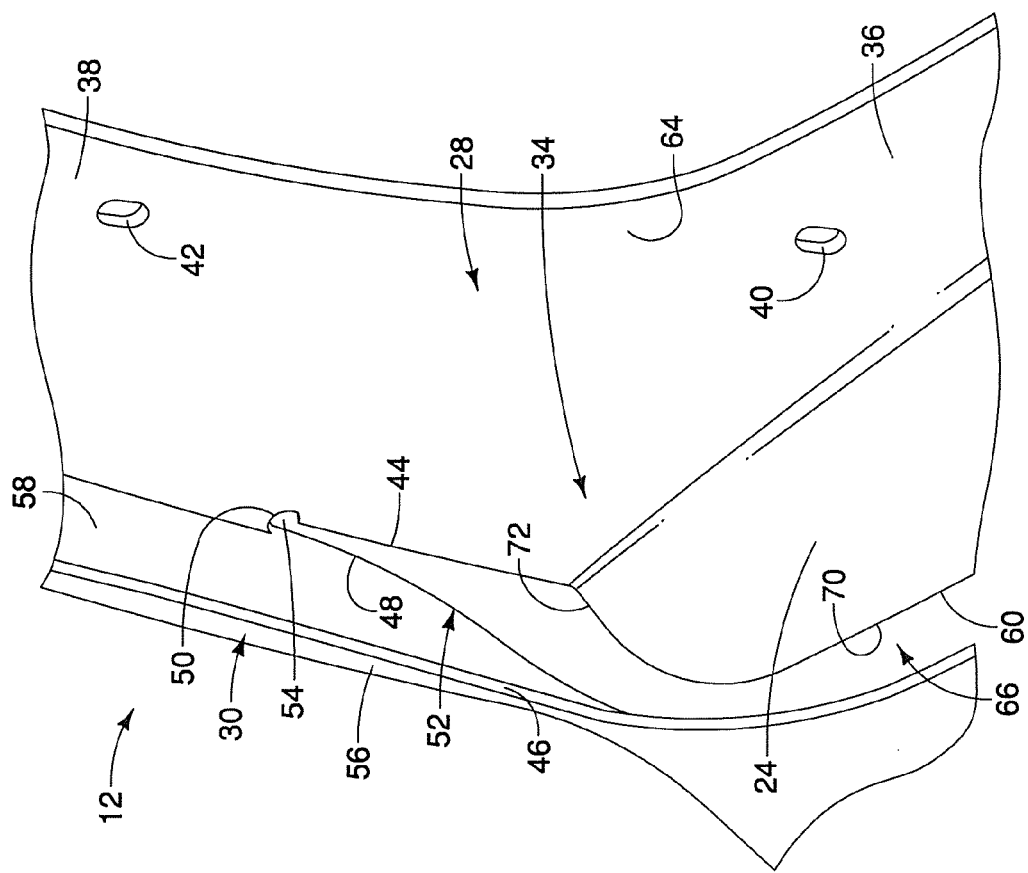
FIG. 16 is a detailed perspective view of the vehicle splash guard showing the pocket and a gap when the vehicle splash guard is in the flexed position.
Figure 15:
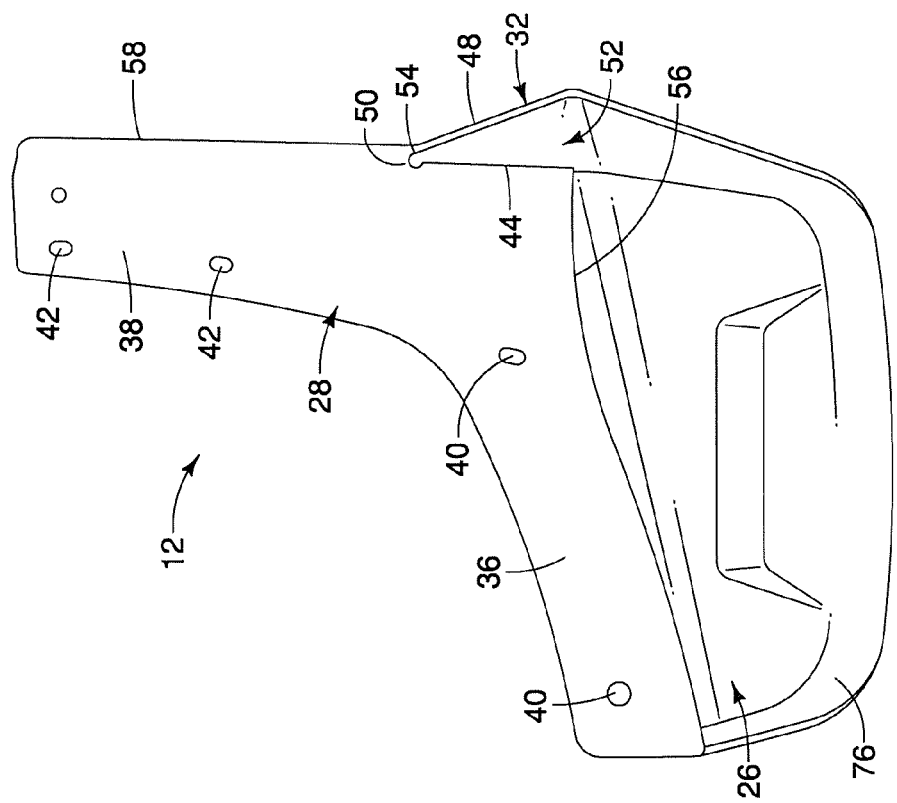
FIG. 15 is a front perspective view of the vehicle splash guard in the flexed position.
Figure 17:
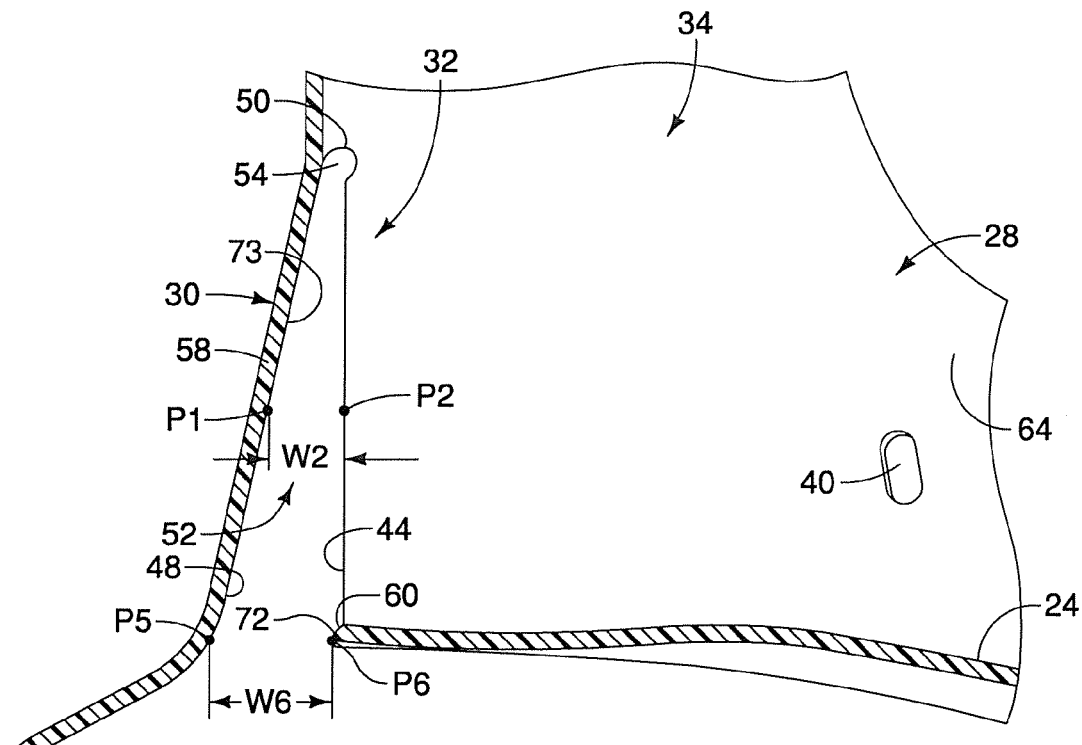
FIG. 17 is a cross-section view of the vehicle splash guard as shown in FIG. 13 illustrating a separation between the mounting portion and the base portion from a lateral wall of the mating portion when the vehicle splash guard is in the flexed position.
Figure 18:
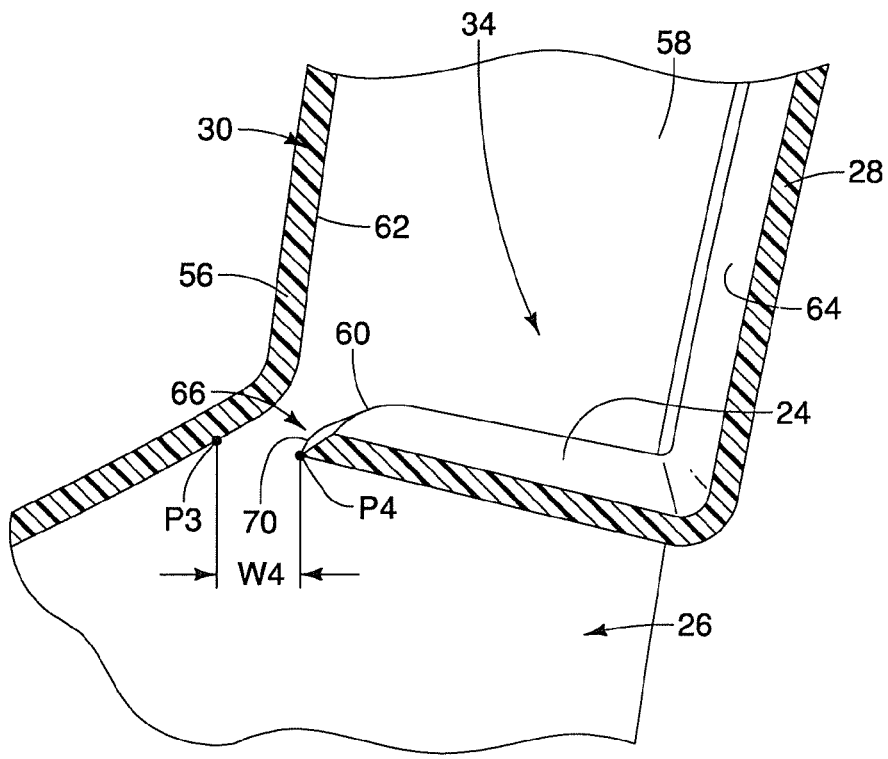
FIG. 18 is a cross-section view of the vehicle splash guard as shown in FIG. 14 illustrating a separation between the base portion and the mating portion when the vehicle splash guard is in the flexed position.

As shown in FIGS. 9, 10 and 14, for example, the flexible portion 32 defines a second gap 66 between the base portion free edge 60 and the mating portion 30. The second gap extends 66 transversely to the first gap 52. As further shown, the flexible portion 32 defines a second apex 68 at or proximate to a location at which the first mating portion free edge 46 joins or is integral with the base portion free edge 60. The base portion free edge 60 extends from the second apex 68 to the mounting portion free edge 44. That is, the base portion free edge 60 has a first length portion 70 positioned adjacent to the rearward wall 56 and a second length portion 72 positioned adjacent to the lateral wall 58 when the guard portion 26 is in the normal position. The first length portion 70 extends from the second apex 68 to the second length portion 72. The second length portion 72 extends from the first length portion 70 to the mounting portion free edge 44. Furthermore, the second length portion 72 extends transversely from the first length portion 70. Also, the second length portion extends 72 transversely from the mounting portion free edge 44.

As with the first gap 52 discussed above, the second gap 66 has a first width W3 defined between point P3 along the forward facing surface 62 of the rearward wall 56 of the mating portion 30 and point P4 along the first length portion 70 of the base portion free edge 60 when the guard portion 26 is in the normal position. Furthermore, the second gap 66 has a first width W5 defined between point P5 along an inner surface 73 of the lateral wall 58 and point P6 along the second length portion 72 of the base portion free edge 60 when the guard portion 26 is in the normal position. Thus, when the guard portion 26 is in the normal position, the points P3 and P4 are directly adjacent, and points P5 and P6 are directly adjacent. Also, the second gap 66 has a second width W4 defined between points P3 and P4, and a second width W6 defined between points P5 and P6, when the guard portion 26 is in the flexed configuration. That is, as is apparent from the Figures, the points P3 and P4 are spaced apart, and the points P5 and P6 are spaced apart, when the guard portion 26 is in the flexed position. Thus, the second width W4 is larger than the first width W3, and the second width W6 is larger than the first width W5.

It should also be understood that the first length portion 70 of the base portion free edge 60 and the forward facing surface 62 of the rearward wall 56 of the mating portion 30 can contact each other, or at least partially contact each other, when the guard portion 26 is in the normal position (e.g., first width W3 is zero or substantially zero). In this event, the first length portion 70 of the base portion free edge 60 and the forward facing surface 62 of the rearward wall 56 of the mating portion 30 can still define the second gap 66 having the second width W4 when the guard portion 26 is in the flexed position as shown, for example, in FIGS. 15 through 18. Also, the second length portion 72 of the base portion free edge 60 and the inner surface 73 of the lateral wall 58 can contact each other, or at least partially contact each other, when the guard portion 26 is in the normal position (e.g., first width W5 is zero or substantially zero). In this event, the second length portion 72 of the base portion free edge 60 and the inner surface 73 of the lateral wall 58 can still define the second gap 66 of the having the second width W6 when the guard portion 26 is in the flexed position as shown, for example, in FIGS. 15 through 18.

As can further be appreciated, the first gap 52 is in communication with the second gap 66. Hence, the lateral wall 58 and the second mating portion free edge 48 move collectively away from the base portion free edge 60 and the mounting portion free edge 44. That is, as shown in FIG. 9, for example, the flexible portion 32 defines an axis 74 extending through the first apex 50 and the second apex 68. Accordingly, the guard portion 26 rotates between the normal position and the flexed position about the axis 74 as shown, for example, in FIGS. 15 through 18. As can further be appreciated, the guard portion 26 includes a distal end 76 which moves in a direction away from the mounting portion 28 when the guard portion 26 moves toward the flexed position.

Accordingly, as can be appreciated from the above, the pivot points (pivot axis) of the guard portion 26 of the vehicle splash guard 12 are further upward along the mounting portion 28 and the mating portion 30 to enhance flexibility of the vehicle splash guard 12, thus enabling the guard portion 26 to move without breaking. Furthermore, at least the mounting portion 28 and the mating portion 30 define a first gap 52 located in the pocket or recess 34. The first gap 52 can extend from the base portion 24 to a guard pivot point, which can be the apex 50 of the first gap 52. Thus, the first gap 52 enables the lateral wall 58 of the mating portion 30 to flex along with the guard portion 26 while mounting portion 28 and base portion 24 remain substantially stationary. Furthermore, the base portion 24 and the mating portion 30 can define a second gap 66 which increases the ability of the mating portion 30 to move with respect to the base portion 24 and the mounting portion 28. Accordingly, the guard portion 26 can move more readily to the flexed position without fracturing.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle splash guard. Accordingly, these terms, as utilized to describe the present invention should be interpreted relative to a vehicle equipped with the vehicle splash guard.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle splash guard comprising:
a base portion;
a guard portion extending from a first side of the base portion;
a mounting portion extending from a second side of the base portion and configured to mount to a vehicle body structure;
a mating portion configured to abut the vehicle body structure, the mating portion extending from the first side of the base portion; and
a flexible portion;
the mating portion being connected to the mounting portion at a first end of the flexible portion, the guard portion and mating portion being both connected to the base portion at a second end of the flexible portion, and the guard portion and mating portion being both free from connection from both the base portion and the mounting portion along the flexible portion between the first end and second end such that the mating portion is configured to flex to move the guard portion relative to the flexible portion between a normal position and a flexed position.

2. A vehicle splash guard comprising:
a base portion;
a guard portion extending from the base portion;
a mounting portion extending from the base portion and configured to mount to a vehicle body structure, the mounting portion including a mounting portion free edge;
a mating portion configured to abut the vehicle body structure, the mating portion including a first mating portion free edge, a second mating portion free edge, a rearward wall and a lateral wall, the first mating portion free edge extending from the base portion to the mounting portion, and the lateral wall extending transversely from the rearward wall, with the second mating portion free edge extending along the lateral wall; and
a flexible portion defined by the mounting portion free edge and the second mating portion free edge, such that the guard portion is configured to move about the flexible portion between a normal position in which the second mating portion free edge is positioned at a first position proximate to the mounting portion free edge and a flexed position in which the second mating portion free edge is spaced at a second position further apart from the mounting portion free edge than the first position.

3. The vehicle splash guard according to claim 2, wherein the base portion includes a base portion free edge further defining the flexible portion and positioned adjacent to the mating portion.

4. The vehicle splash guard according to claim 3, wherein the flexible portion defines an apex at which the first mating portion free edge joins the base portion free edge.

5. The vehicle splash guard according to claim 4, wherein the base portion free edge extends from the apex to the mounting portion free edge.

6. The vehicle splash guard according to claim 4, wherein the base portion free edge has a first length portion positioned adjacent to the rearward wall and a second length portion positioned adjacent to the lateral wall when the guard portion is in the normal position.

7. The vehicle splash guard according to claim 6, wherein the first length portion extends from the apex to the second length portion, and the second length portion extends from the first length portion to the mounting portion free edge.

8. The vehicle splash guard according to claim 6, wherein the lateral wall is spaced apart from the second length portion when the guard portion is in the flexed position.

9. The vehicle splash guard according to claim 3, wherein the flexible portion defines a first gap between the base portion free edge and the mating portion, the first gap having a first width when the guard portion is in the normal position and a second width when the guard portion is in the flexed configuration, the second width being larger than the first width.

10. The vehicle splash guard according to claim 9, wherein the flexible portion defines a second gap between the second mating portion free edge and the mounting portion free edge, and the first gap is in communication with the second gap such that the lateral wall and the second mating portion free edge move collectively away from the base portion free edge and the mounting portion free edge.

11. The vehicle splash guard according to claim 4, wherein the flexible portion defines a second apex at which the second mating portion free edge joins the mounting portion free edge; and
the flexible portion defines an axis extending through the apex and the second apex about which the guard portion rotates between the normal position and the flexed position.

12. The vehicle splash guard according to claim 2, wherein the lateral wall is integral with the guard portion and separate from the base portion.

13. The vehicle splash guard according to claim 2, wherein the flexible portion defines a first apex at which the second mating portion free edge joins the mounting portion free edge; and
the lateral wall is joined with the mounting portion from the first apex to the first mating portion free edge.

14. A vehicle splash guard comprising:
a base portion;
a guard portion extending from the base portion;

a mounting portion extending from the base portion and configured to mount to a vehicle body structure, the mounting portion including a mounting portion free edge;

a mating portion configured to abut the vehicle body structure, the mating portion including a rearward wall, a lateral wall, a first mating portion free edge and a second mating portion free edge; and a flexible portion defined by the mounting portion and the mating portion, such that the guard portion is configured to move about the flexible portion between a normal position and a flexed position in which the mating portion and the mounting portion define a gap between the mounting portion and the mating portion such that the mounting portion free edge and the first mating portion free edge define the gap when the guard portion is in the flexed position;

the flexible portion defining an apex at which the mounting portion free edge and the second mating portion free edge are joined; and the first mating portion free edge extending along the rearward wall and the lateral wall from the base portion to the mounting portion, with the mounting portion and the lateral wall of the mating portion being integral from the apex to the second mating portion free edge.

15. The vehicle splash guard according to claim 1, wherein the mounting portion has an edge including a first length and a second length, the second length defining a mounting portion free edge such that the mating portion is connected to the mounting portion along the first length and free from connection to the mounting portion along the second length.

16. The vehicle splash guard according to claim 15, wherein
the mating portion defines a mating portion free edge positioned adjacent to the mounting portion free edge when the guard portion is in the normal position, with the mounting portion free edge and the mating portion free edge joining at an apex located at the first end of the flexible portion.

17. The vehicle splash guard according to claim 16, wherein
the mating portion defines a second mating portion free edge that extends from the first side of the base portion to the mounting portion.

18. The vehicle splash guard according to claim 16, wherein
the mating portion free edge and the mounting portion free edge define a gap therebetween, the gap having a first width when the guard portion is in the normal position and second width that is larger than the first width when the guard portion is in the flexed position, the second width being tapered to be smaller at the apex and larger away from the apex.

19. The vehicle splash guard according to claim 1, wherein
the base portion has a base portion free edge extending along the flexible portion such that the mating portion is free from connection to the base portion along the base portion free edge.

20. The vehicle splash guard according to claim 19, wherein
the base portion has a first base portion edge extending along the first side of the base portion and including a first length and a second length, the second length defining the base portion free edge, such that the mating portion is connected to the base portion along the first length and free from connection to the base portion along the second length.

21. The vehicle splash guard according to claim 20, wherein
the mating portion has a first wall, and the first wall joins the base portion free edge at an apex located at the first end of the flexible portion, such that the first wall of the mating portion is positioned adjacent to the base portion free edge when the guard portion is in the normal position.

22. The vehicle splash guard according to claim 21, wherein
the first wall of the mating portion and the base portion free edge define a gap therebetween, the gap having a first width when the guard portion is in the normal position and a second width that is larger than the first width when the guard portion is in the flexed position, the second width being tapered to be smaller at the apex and larger away from the apex.

23. The vehicle splash guard according to claim 21, wherein
the base portion has a second base portion edge extending transverse to the first base portion edge, the second base portion edge defining a second base portion free edge.

24. The vehicle splash guard according to claim 23, wherein
the mating portion has a second wall extending transverse to the first wall, the second wall positioned adjacent to the second base portion free edge when the guard portion is in the normal position, and the second wall being spaced apart from the second base portion free edge when the guard portion is in the flexed position.

25. The vehicle splash guard according to claim 1, wherein
the flexible portion includes an axis extending from the first end to the second end, and the guard portion rotates about the axis between the normal position and the flexed position.

26. The vehicle splash guard according to claim 1, wherein
the flexible portion has a first length portion, a second length portion, and a third length portion, wherein the first length portion extends from a first apex at which the mating portion is connected to the mounting portion to the third length portion, the second length portion extends from a second apex at which the mating portion is connected to the base portion to the third length portion, and the third length portion extends from the first length portion to the second length portion.

27. The vehicle splash guard according to claim 26, wherein
the third length portion extends transverse to the first length portion and transverse to the second length portion.

28. The vehicle splash guard according to claim 26, wherein
the first length portion defines a first gap between a first wall of the mating portion and a free edge of the mounting portion, the second length portion defines a second gap between a second wall of the mating portion and a first free edge of the base portion, and the third length defines a third gap between the second wall of the mating portion and a second free edge of the base portion, with the first gap, second gap, and third gap all in communication such that the first wall and the second wall move collectively away from the first free edge of the base portion, the second free edge of the base portion, and the free edge of the mounting portion as the guard portion moves from the normal position to the flexed position.

29. The vehicle splash guard according to claim 26, wherein
   the mounting portion has a mounting portion free edge extending along the first length portion of the flexible portion, and the base portion has a base portion free edge; wherein the mounting portion free edge extends from the first apex to the base portion free edge, and the base portion free edge extends from the second apex to the mounting portion free edge.

* * * * *